United States Patent
Barmeier et al.

(10) Patent No.: US 10,982,909 B2
(45) Date of Patent: Apr. 20, 2021

(54) HEAT EXCHANGE SYSTEM WITH COMPENSATION OF DIMENSION CHANGE OF HEAT STORAGE MATERIAL AND METHOD FOR EXCHANGING HEAT BY USING THE HEAT EXCHANGE SYSTEM

(71) Applicant: Siemens Gamesa Renewable Energy A/S, Brande (DK)

(72) Inventors: Till Andreas Barmeier, Hamburg (DE); Niels Pagelsen, Hamburg (DE); Volker Seidel, Barcelona (ES); Jennifer Verena Wagner, Hamburg (DE)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 15/752,600

(22) PCT Filed: Sep. 29, 2016

(86) PCT No.: PCT/EP2016/073294
§ 371 (c)(1),
(2) Date: Feb. 14, 2018

(87) PCT Pub. No.: WO2017/055472
PCT Pub. Date: Apr. 6, 2017

(65) Prior Publication Data
US 2018/0245860 A1 Aug. 30, 2018

(30) Foreign Application Priority Data
Sep. 30, 2015 (EP) .................................... 15187768

(51) Int. Cl.
*F28D 20/00* (2006.01)
*F24H 7/04* (2006.01)

(52) U.S. Cl.
CPC ........ *F28D 20/0056* (2013.01); *F24H 7/0458* (2013.01); *F28D 2020/0017* (2013.01); *Y02E 60/14* (2013.01)

(58) Field of Classification Search
CPC .... F28D 17/04; F28D 17/005; F28D 20/0056; F28D 2020/0013; F28D 2020/0069;
(Continued)

(56) References Cited

U.S. PATENT DOCUMENTS

2003/0116305 A1\* 6/2003 Beddome .............. F28D 9/0043
165/81
2008/0066736 A1 3/2008 Zhu
(Continued)

FOREIGN PATENT DOCUMENTS

CN 103423798 A 12/2013
WO WO 2008154455 A2 12/2008
(Continued)

OTHER PUBLICATIONS

International Search Report/Written Opinion for PCT/EP2016/073294.
(Continued)

*Primary Examiner* — Travis C Ruby
(74) *Attorney, Agent, or Firm* — Schmeiser, Olsen & Watts LLP

(57) ABSTRACT

A heat exchange system with at least one heat exchange chamber with heat exchange chamber boundaries which surround at least one heat exchange chamber interior of the heat exchange chamber is provided. The heat exchange chamber boundaries include at least one first opening for guiding in an inflow of at least one heat transfer fluid into the heat exchange chamber interior and at least one second opening for guiding out an outflow of the heat transfer fluid out of the heat exchange chamber interior. At least one heat
(Continued)

storage material is arranged in the heat exchange chamber interior such that a heat exchange flow of the heat transfer fluid through the heat exchange chamber interior causes a heat exchange between the heat storage material and the heat transfer fluid.

19 Claims, 5 Drawing Sheets

(58) Field of Classification Search
CPC ..... F28D 2020/0082; F28D 2020/0017; F28D 2020/0095; F28D 2020/0091; F28D 2020/0078; F28F 21/04; F28F 2270/00; F24H 7/0458; F24H 7/002; F24H 7/0483
See application file for complete search history.

(56) References Cited

U.S. PATENT DOCUMENTS

| | | | |
|---|---|---|---|
| 2009/0194250 A1 | 8/2009 | Kudo | |
| 2012/0211002 A1* | 8/2012 | Humphreys | F24H 9/02 126/640 |
| 2012/0241120 A1* | 9/2012 | Hagel | B60H 1/00492 165/10 |
| 2013/0206356 A1* | 8/2013 | Pedretti | F28D 20/0056 165/10 |
| 2014/0318530 A1 | 10/2014 | Gerpheide | |

FOREIGN PATENT DOCUMENTS

| WO | WO 2011104556 A2 | 9/2011 |
|---|---|---|
| WO | WO 2017055345 A1 | 4/2017 |
| WO | WO 2017055472 A1 | 4/2017 |

OTHER PUBLICATIONS

Non-English Chinese Office Action dated Apr. 22, 2019 for Application No. 201680057663.4.

* cited by examiner

HEAT EXCHANGE SYSTEM WITH COMPENSATION OF DIMENSION CHANGE OF HEAT STORAGE MATERIAL AND METHOD FOR EXCHANGING HEAT BY USING THE HEAT EXCHANGE SYSTEM

CROSS-REFERENCE TO RELATED APPLICATIONS

This application claims priority to PCT Application No. PCT/EP2016/073294, having a filing date of Sep. 29, 2016, based on European Application No. 15187768.5, having a filing date of Sep. 30, 2015, the entire contents both of which are hereby incorporated by reference.

FIELD OF TECHNOLOGY

The following relates to a heat exchange system with a heat exchange chamber and a method for exchanging heat by using the heat exchange system.

BACKGROUND

Despite the integration of renewable energy into the public electric energy system (power grid) a large share of electricity is nowadays still generated by fossil energy sources. But the global climate change requires the further development of renewable energies.

The energy output of renewable energy sources like wind and solar is not constant throughout a day or throughout a year. Consequently, electricity which is generated by utilizing energy from renewable energy sources fluctuates.

In order to manage this fluctuating electricity, heat (thermal energy) storage systems are developed for storing and releasing thermal energy (heat exchange system). Such a heat exchange system comprises a heat exchange chamber with heat exchange chamber boundaries which surround a heat exchange chamber interior. The heat exchange chamber interior is filled with heat storage material like stones. The heat exchange chamber boundaries comprise a first opening for guiding an inflow of a heat transfer fluid, e.g. air, into the heat exchange chamber interior and a second opening for guiding out an outflow of the heat transfer fluid out of the heat exchange chamber interior.

For a charging mode, the heat exchange system additionally comprises a charging unit for heating the heat transfer fluid with the aid of excess electricity. The resulting hot heat transfer fluid is infused into the heat exchange chamber interior via one of the openings (e.g. first opening) of the heat exchange chamber boundaries. This opening defines a "hot" terminal of the heat exchange chamber. The hot heat transfer fluid is guided through the heat exchange chamber interior. By the guiding of the hot heat transfer fluid through the heat exchange chamber interior a heat transfer from the heat transfer fluid to the heat storage material is caused. Heat is stored by the heat storage material.

Via the other opening (second opening) of the heat exchange chamber the resulting "cold" heat transfer fluid is guided out of the heat exchange chamber interior. Thereby, this opening of the heat exchange chamber boundaries defines a "cold" terminal (end) of the heat exchange chamber. The charging mode is stopped when the temperature at the cold terminal of the heat exchange chamber begins to rise above a predetermined temperature.

In a discharging mode of the heat exchange chamber this stored heat can be recovered: "cold" heat transfer fluid is infused into the heat exchange chamber interior via the first opening of the heat exchange chamber boundaries. In this case, the first opening defines a "cold" terminal. The cold heat transfer fluid is guided through the hot heat exchange chamber interior. By the guiding of the cold heat transfer fluid through the heat exchange chamber interior a heat transfer from the heat storage material to the heat transfer fluid is caused. Heat is released from the heat storage material.

Via the second opening of the heat exchange chamber boundaries the resulting "hot" heat transfer fluid is guided out of the heat exchange chamber interior. Thereby, the second opening of the heat exchange chamber defines a "hot" terminal of the heat exchange chamber.

The resulting hot heat transfer fluid can be used for generating steam with which a steam turbine is driven. A result of the described discharging mode: Heat is transformed back to electricity.

The discharging mode is stopped when the temperature at the hot terminal of the heat exchange storage begins to drop below a certain temperature.

For instance, the heat storage material comprises stones. Due to thermally induced stress the stones break during the charging mode which results in a packing (compacting) of the stones. In addition, cyclic thermal loads lead to an extension and shrinking of the stones and therefore to a further compacting of the bed. Assumed that the total volume of the heat exchange chamber remains constant, this causes additional paths for the heat transfer fluid through the heat exchange chamber interior. The flow of the heat transfer fluid trough the heat exchange chamber interior can hardly be controlled.

SUMMARY

An aspect relates to a heat exchange system with a heat exchange chamber through which a heat transfer fluid can be uniformly guided.

A heat exchange system is provided with at least one heat exchange chamber with heat exchange chamber boundaries which surround at least one heat exchange chamber interior of the heat exchange chamber. The heat exchange chamber boundaries comprise at least one first opening for guiding in an inflow of at least one heat transfer fluid into the heat exchange chamber interior and at least one second opening for guiding out an outflow of the heat transfer fluid out of the heat exchange chamber interior. At least one heat storage material is arranged in the heat exchange chamber interior such that a heat exchange flow of the heat transfer fluid through the heat exchange chamber interior causes a heat exchange between the heat storage material and the heat transfer fluid. The heat exchange chamber comprises at least one packing device for compensation of a packing (settling) of the heat storage material within the heat exchange chamber interior. Preferably, at least one of the heat exchange chamber boundaries comprises the packing device. The heat exchange chamber boundary with the packing device is a ceiling of the heat exchange chamber. For instance, the ceiling is a sagging ceiling. Alternatively, the heat exchange chamber boundary with the packing device a side heat exchange chamber boundary (side wall) of the heat exchange chamber. This side wall of the chamber preferably comprises at least one sheet pile wall. This sheet pile wall is flexible.

In a further preferred embodiment, the packing device comprises at least one flexible flow obstacle for the heat exchange flow. The heat exchange flow is suppressed. For instance, the flexible flow obstacle comprises at least one bag which is filled with air (air bag).

To prevent bypass flows and resulting heat losses (e. g. at the storage outlet), one or more air bags can be installed between a supporting structure of the heat storage material in the heat exchange chamber interior of the heat exchange chamber and the lowering, insulated ceiling of the heat exchange chamber. The number and the size of installed air bags depend on the permeability of the insulation above the heat storage material towards the heat transfer fluid. The air bags block the flow of the heat transfer fluid, so that it has to flow through the heat storage material to reach the second opening.

The air bag can be made out of a flexible, elastic material which adapts to the form of the gap resulting from the settling of solid heat storage material.

Advantageously, it is temperature resistant to the temperatures occurring above the (preferably insulated) ceiling of the heat exchange chamber. The volume of the air bag has to adapt to the volume of the gap (especially height and width if the length of the air bag is parallel to the flow direction of the heat transfer fluid) at all times during operation. This can be solved by pumping a fluid (e.g. air) into the air bag when the heat storage material heat exchange chamber is cooled down (discharging) and by pumping a fluid out of the air bag when the storage is heated up (charging) in a way that the pressure in the air bag is kept controlled.

Moreover, a method for exchanging heat by using the heat exchange system is provided. In an operating mode of the heat exchange system the heat exchange flow of the heat transfer fluid is guided through the heat exchange chamber interior, wherein a heat exchange between the heat storage material and the heat transfer fluid is caused.

The heat exchange chamber is a space, cavity or a housing in which the heat storage material is located. Inside of the heat exchange chamber the heat exchange takes place. In order to provide an efficient heat exchange, the heat exchange chamber is preferably thermally insulated against the surroundings. The loss of heat is reduced by the thermal insulation.

The heat transfer fluid is guided (led) into the heat exchange chamber interior via the first opening and is guided out of the heat exchange chamber interior via the second opening. The first opening of the heat exchange chamber boundaries is an inlet opening. The second opening of the heat exchange chamber boundaries is an outlet opening. Thus, there are different areas of the heat exchange chamber boundaries, namely an inlet area of the heat exchange chamber boundaries with the first opening and an outlet area of the heat exchange chamber boundaries with the second opening.

The operating mode of the heat exchange system is selected from the group consisting of charging mode with a heat transfer from the heat transfer fluid to the heat storage material and a discharging mode with a heat transfer from the heat storage material to the heat transfer fluid.

Depending on the operating mode, a specific opening can have the function of an inlet opening or the function of an outlet opening. The flow direction of the heat exchange flow depends on the operating mode. Preferably, during the charging mode the heat exchange flow is directed in a charging mode direction, during the discharging mode the heat exchange flow is directed in a discharging mode direction and the charging mode direction and the discharging mode direction are opposed to each other (countercurrent operation). But, a change of the directions of the heat exchange flow is not necessary. Charging mode direction and discharging mode direction comprise the same direction (co-current operation).

In countercurrent operation, switching from the charging mode to the discharging mode the direction of the heat exchange flow through the heat exchange chamber interior is reversed and consequently, the function of the openings (inlet opening, outlet opening) as well as a relative temperature (cold or hot) at the respective opening is reversed, too. With such a solution it is especially advantageous to use the same heat transfer fluid for the charging mode and for the discharging mode. But of course, different heat transfer fluids for the charging mode and the discharging mode can be used, too.

For the charging mode, the heat exchange system is equipped with at least one charging unit for heating the heat transfer fluid. This charging unit is preferably located upstream of the heat exchange chamber.

Preferably, the charging unit comprises at least one electrical heating device which is selected from the group consisting of resistance heater, inductive heater, emitter of electromagnetic radiation and heat pump. The electromagnetic radiation is preferably infrared radiation. A combination of different electrical heating devices is possible. With the aid of the electrical heating devices electricity is transformed into heat. This heat is absorbed by the heat transfer fluid and transported to the heat storage material in the heat exchange chamber interior.

For instance, the electrical heating device comprises a resistance heater. This heater is located in the heat exchange inflow. The resistance heater comprises a large heat exchange area for an efficient heat exchange from the resistance heater to the heat transfer fluid. For instance, the large heat exchange area is formed by a grid of the resistance heater. A meander shaped resistance heater is possible, too. With such a measure, the heat transfer to the heat transfer fluid is enhanced. In addition, the possibility of the (not desired) occurrence of hot spots within the resistance heater is reduced.

The heat exchange system is preferably equipped with at least one discharging unit for discharging the heat transfer fluid of the outflow from heat for production of electricity. Heat is removed from the heat transfer fluid. The removed heat is transformed into electricity. In a preferred embodiment, the transformation of heat into electricity is carried by a water/steam cycle for driving a turbine of a steam power plant.

The discharging mode can be realized when electricity prices and demand are high or when the production of renewable energies is low. For that and in order to limit the costs which are connected to embodiments of the invention, it is advantageous to use existing power plants. So, the heat exchange system is a kind of retrofit system. For instance, well suited are CCPP (combined cycle power plant) since their heat recovery steam generator (HRSG) is similar to the application proposed here. Nevertheless, hard coal, oil, gas, waste incineration, wood or lignite fired power plants can be used since the charging unit can be designed for high temperatures to match the temperatures used in the steam generator. In a hybrid mode the fuel can be used to increase the temperature from the temperature level of the heat exchange system to the operating temperature of the original furnace or boiler design.

In a preferred embodiment, the heat exchange system is equipped with a at least one flow adjusting element for adjusting the exchange flow through the heat exchange chamber interior, for adjusting the inflow into the heat exchange chamber interior and/or for adjusting the outflow out of the heat exchange chamber. The flow adjusting element comprises at least one active fluid motion device which is selected from the group consisting of blower, fan and pump and/or the flow adjusting element comprises at least one passive fluid control device which is selected from the group consisting of activatable bypass pipe, nozzle, flap, damper and valve. A multitude of these devices are possible as well as a combination of these devices. In addition, flow adjusting elements can be arranged serially or in parallel. For instance, two flaps are arranged at two openings in order to adjust the inflows of the heat transfer fluid into the heat exchange chamber interior and consequently in order to adjust the temperature distribution in the heat exchange chamber interior.

The advantage of passive control devices is that they are cheap. In addition, passive control devices are very reliable. But preferably, active motion devices are used. By that, it is advantageous that driving units of the active fluid motion devices like electrical motors and electrical equipment are located outside of the heat exchange flow with the (possibly very hot) heat transfer fluid.

Just to be noted: There are different locations for the flow adjusting element possible. The flow adjusting element can be directly arranged in the heat exchange chamber interior, downstream of the heat exchange chamber interior and/or upstream of the heat exchange chamber interior. The location depends—inter alia—on the kind of flow adjusting element (active fluid motion device or passive fluid control device).

The solid material comprises preferably bulk material. Mixtures of different solid materials are possible, too.

In a preferred embodiment, the heat storage material comprises at least one chemically and/or physically stable material. In the range of the operational temperature of the heat exchange system the heat storage material does not change its physical and/or chemical properties. A physically stable material does not change its physical properties during the heat exchange. For instance, the heat storage material remains in a solid state in the operating temperature range.

In a preferred embodiment, the heat storage material comprises sand and/or stones.

Preferably, the stones comprise gravel (pebbles, unconsolidated gravel), rubbles and/or grit (splits). For instance, basalt, granite or gabbro is suitable. The artificial material comprises preferably clinkers or ceramics. Again, mixtures of the mentioned materials are possible, too.

In order to provide a cheap energy storage material it is advantageous to use waste material. Therefore, in a preferred embodiment, the artificial material comprises at least one by-product of an industrial process. For instance, the by-product is iron silicate. Iron silicate origins from a slag of copper production.

In a preferred embodiment, heat exchange channels are embedded in the heat storage material for guiding of the heat exchange flow through the heat exchange chamber interior. The heat storage material forms a heat exchange bed. The heat exchange bed comprises the heat exchange channels. The heat exchange channels are embedded into the heat storage bed such that the heat exchange flow of the heat transfer fluid through the heat exchange channels causes the heat exchange between the heat storage material and the heat transfer fluid. The heat exchange channels can be formed by interspaces (gaps) of the heat storage material. For instance, the heat storage material comprises stones. The stones form the heat exchange bed with the heat exchange channels. In addition or alternatively, the heat storage material is porous. Open pores of the heat storage material form the heat exchange channels.

The heat transfer fluid is selected from the group consisting of a liquid and a gas. The gas is selected from the group consisting of inorganic gas and/or organic gas. The inorganic gas is preferably air. Mixtures of different liquids are possible as well as mixtures of different gases.

Preferably, the heat transfer fluid comprises a gas at ambient gas pressure. Preferably, the gas at the ambient pressure is air. The ambient pressure (900 hPa to 1,100 hPa) varies such that the heat exchange flow through the heat exchange chamber interior is caused.

For the guiding of the heat transfer fluid into the heat exchange chamber interior and for the guiding of the heat transfer fluid out of the heat exchange chamber interior a pipe system (or channel system, ducting system) is used. This pipe system can be closed (with a closed loop) or can be open (with an open loop).

For instance, the heat transfer fluid is ambient air of the environment. The loop is an open loop. Air from the environment is introduced into the heat exchange system and air of the heat exchange system is released to the surroundings. There is an air exchange during the operation of the heat exchange system.

In contrast to that, there is no air exchange or a selectively adjustable air exchange during the operation in a closed loop. Air of the environment is not added or just added on a small scale to the air which is used as heat transfer fluid. This has following specific advantage: In a situation with almost completely charged heat storage material, heat transfer fluid with remaining heat would be released to the environment in an open loop. The remaining heat is lost. In contrast to that, in a closed loop this heat transfer fluid with remaining heat stays in heat exchange system. The remaining heat is not lost. Therefore, in a preferred embodiment, a closed loop is implemented and wherein the inflow comprises the outflow. The outflow is guided back into the heat exchange chamber interior.

The heat exchange chamber can be a vertical heat exchange chamber and/or a horizontal heat exchange chamber. Preferably, the heat storage chamber is a horizontal heat exchange chamber.

The term "horizontal heat exchange chamber" implies a horizontal main (average) flow of the heat transfer fluid through the heat exchange chamber interior. The flow direction of the horizontal main flow is essentially parallel to the average surface of the earth. The horizontal direction is essentially a perpendicular direction to the direction of the gravity force which affects the heat transfer fluid. Perpendicular means in this context that deviations from the perpendicularity of up to 20° and preferably deviations of up to 10° are possible.

A horizontally oriented direction of the heat exchange flow can be achieved by lateral first openings and/or lateral second openings. The horizontal heat exchange chamber comprises these openings in its side heat exchange chamber boundaries. In addition, with the aid of an active fluid motion device like a blower or a pump the heat exchange flow in the heat exchange chamber interior is caused. The heat transfer fluid is blown or pumped into the heat exchange chamber interior or is pumped or sucked out of the heat exchange chamber interior. In a horizontal heat exchange chamber due to natural convection the temperature of the heat storage material along the cross section perpendicular to the flow direction of the heat transfer fluid (see below) can differ (inclined isothermal lines).

It has to be noted that the terms "horizontal" (and "vertical") are independent from the dimensions of the heat exchange chamber and its orientation. Decisive is the direction of the flow of the heat transfer fluid through the heat exchange chamber interior. For instance, a "horizontal heat exchange chamber" can have a chamber length which is less than the chamber height of the heat exchange chamber.

Besides pure vertical and horizontal heat exchange chambers, a mixture of "vertical heat exchange chamber" and "horizontal heat exchange chamber" is possible, too. In such a heat exchange chamber, the main flow of the heat transfer fluid is the result of horizontal and vertical movement of the heat transfer fluid through the heat exchange chamber interior. The main flow is guided through the heat exchange chamber in an angle.

In a preferred embodiment, at least two first openings are arranged vertically to each other and/or at least two second openings are arranged vertically to each other. Openings are arranged above each other. By this measure it is possible to influence a vertical distribution of heat exchange flows in order to improve a temperature distribution (temperature front) in the heat storage material and heat exchange chamber interior respectively. Isothermal lines perpendicular to the flow direction are influenced.

The temperature front is defined by neighboring cold and hot areas of the heat storage material in the heat exchange chamber interior caused by the flow of the heat transfer fluid through the heat exchange chamber interior. The temperature front is aligned perpendicular to the respective flow direction of the heat exchange flow through the heat exchange chamber. During the charging mode the heat exchange flow is directed in a charging mode direction wherein the temperature front moves along this charging mode direction. In contrast to that, during the discharging mode the heat exchange flow is directed in the discharging mode direction (e.g. opposite to the charging mode direction during countercurrent operation) wherein the temperature front moves along the discharging mode direction. In both cases, the temperature front of the heat exchange chamber is migrating through the heat exchange chamber to the respective hot/cold ends of the heat exchange chamber. It is to be noted that in case of countercurrent operation, the hot (hot opening) end remains the hot end (hot opening), independently from the mode (charging mode or discharging mode).

The temperature front is a zone of strong temperature gradient in the heat storage material, i.e. high temperature difference between hot and cold areas. In this application it separates the hot (charged with heat) and the cold (not charged) zone in the heat exchange chamber with the heat storage material. The temperature front develops due to the transfer of heat from the heat transfer fluid to the heat storage material during the charging mode and due to the transfer of heat from the heat storage material to the heat transfer fluid during the discharging mode. Isothermal zones/lines develop ideally (e.g. without the influence of gravitation) perpendicular to the main flow direction, i.e. zones/lines of constant temperature.

In order to optimize the efficiency of the heat exchange system it is advantageous to ensure a uniform temperature front. There are just small variations concerning the temperature gradients perpendicular to the flow direction. In a vertical heat exchange chamber with a flow direction top down, the temperature front is nearly uniform due to natural convection. So, in this case additional measures are not necessary. In contrast to that, natural convection leads to a non-uniform temperature front in a horizontal heat exchange chamber. So, in this case additional measures could be meaningful (like usage of more openings or usage of more flow adjusting elements).

Preferably, the chamber boundary with one of the openings comprises a transition area with a tapering profile such that an opening diameter of the opening aligns to a first tapering profile diameter of the tapering profile and a chamber diameter of the heat exchange chamber aligns to a second tapering profile diameter of the tapering profile. The transition area comprises an increasing cross section from the respective opening towards the heat exchange chamber. This is especially advantageous for the first opening for guiding the heat transfer fluid into the heat exchange chamber. The diameter of the transition area expands from the opening diameter of the first opening to the diameter of the heat exchange chamber. With the aid of the tapering profile the inflow of the heat transfer fluid is guided into the heat exchange chamber interior. The guided inflow is distributed to a wide area with the heat storage material. By this measure a capacity of the heat exchange unit (heat storage material which is located in the heat exchange chamber) can be highly exploited. In addition, the efficiency of the heat exchange can be improved by adapting the heat exchange flow. Remark: For additionally adapting the heat exchange flow, a diffuser can be located at the first opening, especially in the transition area. By means of the diffuser an incident flow of the heat transfer fluid into the heat exchange chamber interior can be adjusted. For instance, such a diffuser is formed by stones which are located in the transition area with the tapering profile.

For the case that the heat exchange chamber comprises a number of first openings it is very advantageous to arrange a described transition area at that number of first openings. Thereby, the first openings can comprise a joint transition area or individual transition areas.

The transition area with the second opening for guiding the heat transfer fluid out of the heat exchange chamber interior can be tapered, too. By this measure the guiding of heat flow out of the heat exchange chamber interior of the heat exchange chamber is simplified.

In this context, the use of a short transition area is very advantageous. For instance, the short transition area comprises a dimension which is less than 50% of a length of the heat exchange chamber. For instance, the dimension is about 20% of the length of the heat exchange chamber. The length is the dimension of the heat exchange chamber that is parallel to the main flow direction of the heat transfer fluid through the heat exchange chamber interior. But of course, the dimension of the transition area is dependent on a number of features of the complete heat exchange system, e.g. temperature of the heat transfer fluid, mass flow of the heat exchange flow, speed of the heat exchange flow at the relevant opening temperatures, etc.

In order to save space and in order to reduce the surface-volume ratio for a reduced heat loss, it is advantageous to implement a transition area as short as possible. The result is a short transition channel for guiding the inflow into the heat exchange chamber interior. Besides an efficient usage of the capacity of the heat exchange chamber a low space requirement is connected to this solution.

Preferably, the heat exchange chamber comprises a cylindrically shaped chamber boundary. For instance, the chamber boundary which comprises the first opening is formed as a circular cylinder and/or the chamber boundary with the second opening is formed as a circular cylinder. Such shapes lead to best surface-volume ratios.

The dimensions of the heat exchange chamber can be different. But, embodiments of the invention are especially advantageous for heat exchange systems with large heat exchange chambers. Therefore, in a preferred embodiment, the horizontal heat exchange chamber comprises a heat exchange chamber length which is at least twice of a heat exchange chamber width of the heat exchange chamber and/or which is at least twice of a heat exchange chamber height of the heat exchange chamber. Preferably, the heat exchange chamber length is selected from the range between 20 m and 300 m. In addition, the heat exchange chamber width and/or the heat exchange chamber height are selected from the range of 1 m to 100 m.

Preferably, the eat exchange chamber of the heat exchange system is buried. More preferable, the heat exchange chamber is located in an excavation. Therefore, according to a preferred embodiment, the heat exchange chamber is at least partly arranged in at least one soil excavation of a soil. The resulting heat exchange is cheaper in comparison to a heat exchange system which is built up on the surface of a ground. So, at least one of the heat exchange chamber boundaries is at least partly formed by at least one soil boundary.

The heat exchange system is especially adapted for operation at high temperatures of more than 300° C. Therefore, in a preferred embodiment, an operating temperature of the operating mode is selected from the range between 300° C. and 1000° C., preferably selected from the range between 500° C. and 1000° C., more preferably selected from the range between 600° C. and 1000° C., 650° C. to 1000° C. and most preferably between 700° C. and 1000° C. A deviation of the temperature ranges is possible. In this context, very advantageous is an upper limit of the temperature range of 900° C. and most preferably an upper limit of the temperature range of 800° C. The heat exchange system is a high temperature heat exchange system.

Embodiments of the invention can be applied for renewable energy production as well as for conventional energy production. For instance, in order to increase the flexibility the steam cycle of fossil fired power plants (or nuclear power plants, etc.) it can be combined with the heat exchange system proposed here. In this case, the boiler of the steam cycle of the power plant can be operated with fuel when fuel costs are lower than electricity costs and the heat exchange system is charged in periods when electricity prices are low. Alternatively, the charging can take place during a period of excess production of energy.

The advantage of the following lies in the avoidance of gaps within the heat storage material caused by packing of the heat storage material. These gaps have a lower flow resistance than the filling of the heat exchange chamber interior with heat storage material. Hence, it is prevented that areas in heat exchange chamber interior are preferably flown through by the flow of the heat transfer fluid due to lower resistance. The overall system efficiency is increased, because of the improved perfusion and heat exchange. Furthermore the described solutions are both passive and therefore not expensive to maintain and with no energy consumption and can be implemented with low costs.

BRIEF DESCRIPTION

Some of the embodiments will be described in detail, with references to the following Figures, wherein like designations denote like members, wherein.

DETAILED DESCRIPTION

Figure 1:
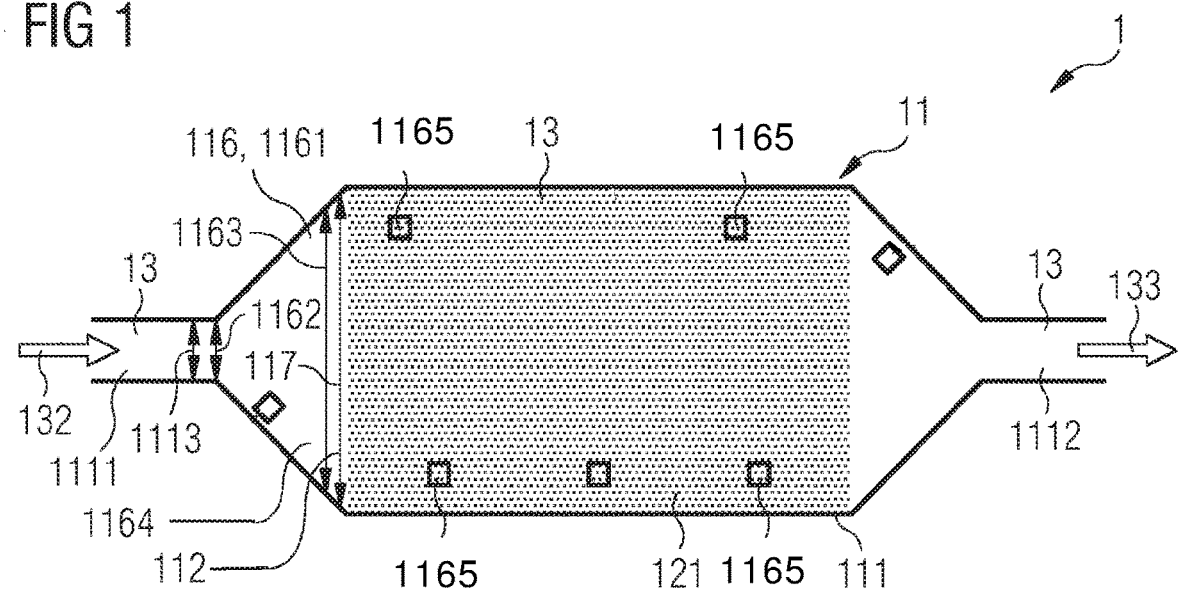
FIG. 1 shows a heat exchange chamber of the heat exchange system.

Core of embodiments of this invention is a heat exchange system 1 with a heat exchange chamber 11 on a high temperature level.

Heat storage material 121 (e.g. stones or sand) which is located in the heat exchange chamber interior 112 of the heat exchange chamber 11 can be charged and discharged with heat via the heat transfer fluid 13. Heat is stored by the heat storage material 121 and can be release from the storage material.

The temperature level of the stored heat is significantly higher compared to methods applied so far to increase the efficiency. The temperature level lies between 300° C. and 1000° C., preferably between 500° C. and 1000° C., more preferably between 650° C. and 1000° C. and most preferably between 700° C. and 1000° C. The thermal capacity of the heat exchange system 1 lies in the range between 0.3 GWh and 100 GWh which causes a thermal power of 50 MW.

The heat exchange system 1 comprises at least one heat exchange chamber 11 with heat exchange chamber boundaries 111 which surround at least one heat exchange chamber interior 112 of the heat exchange chamber 11. The heat exchange chamber 11 is a horizontal heat exchange chamber 113.

The heat exchange chamber boundaries 111 comprise at least one first opening 1111 for guiding in an inflow 132 of at least one heat transfer fluid 13 into the heat exchange chamber interior 112 and at least one second opening 1112 for guiding an outflow 133 of the heat transfer fluid 13 out of the heat exchange chamber interior 112. At least one heat storage material 121 is arranged in the heat exchange chamber interior 112 such that a heat exchange flow 132 of the heat transfer fluid 13 through the heat exchange chamber interior 112 causes a heat exchange between the heat storage material 121 and the heat transfer fluid 13.

Additionally, the heat exchange chamber 11 comprises at least one packing device 123 for compensation of a packing of the heat storage material 121 within the heat exchange chamber interior 112.

Exemplarily, the heat exchange chamber length of the horizontal heat exchange chamber 11 is about 200 m, the heat exchange chamber height of the heat exchange chamber 11 is about 10 m and the heat exchange chamber width of the heat exchange chamber is about 50 m.

With the aid of the proposed heat exchange system 1, thermal energy can be stored on a high temperature level during the charging mode. This stored thermal energy can be used during the discharging mode for the production of steam in a water steam cycle for reconversion into electrical energy.

There is a transition area 116 of the heat exchange chamber 11 with a tapering profile 1161. Thereby an opening diameter 1113 of the opening 1111 or 1112 aligns to a first tapering profile diameter 1162 of the tapering profile 1161 and a chamber diameter 117 of the heat exchange chamber 11 aligns to a second tapering profile diameter 1163 of the tapering profile 1161.

The inflow 132 of the heat transfer fluid 13 is guided into the heat exchange chamber interior 112. The guided inflow 132 is distributed to a wide area of heat storage material 121. By this measure a capacity of the heat exchange unit (heat storage material 121 which is located in the heat exchange chamber interior 112) can be utilized in an advantageous manner.

The transition area 116 is short. The short transition area 116 projects into the heat exchange chamber 11. The result is a short transition channel for the guiding of the inflow 132 into the heat exchange chamber interior 112 of the heat exchange chamber 11.

The heat exchange system 1 is additionally equipped with at least one flow adjusting element 134 for adjusting a mass flow (see arrow in FIG. 2) of the heat exchange flow 13 of the heat transfer fluid 131 through the heat exchange chamber interior 11. The flow adjusting element 134 is an active fluid motion device 134 like a blower or a pump. Such a device enables a transportation of the heat transfer fluid 13 through the heat exchange chamber interior 112 of the heat exchange chamber 11. The blower or the pump can be installed upstream or downstream of to the heat exchange chamber 11.

In the charging mode, the heat transfer fluid 13 enters the heat exchange chamber 11 through a diffuser 1164. The diffuser 1164 comprises stones 1165 and is arranged at the transition area 116 of the heat exchange chamber 11.

Figure 3:
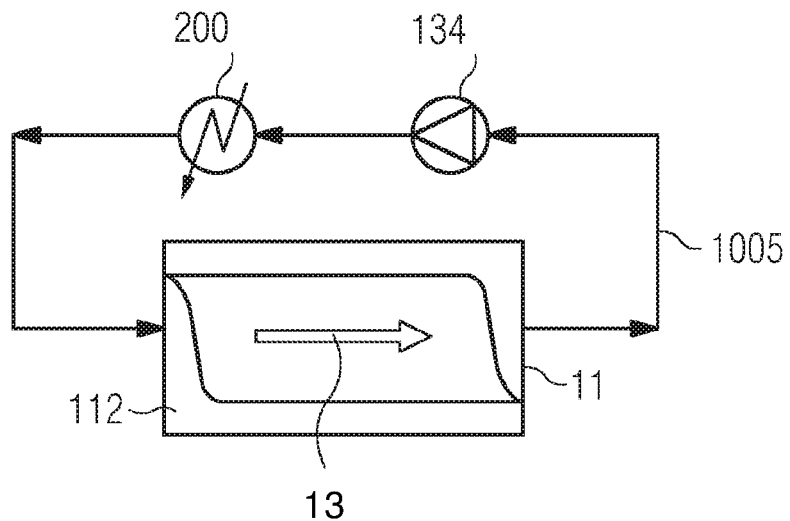
FIG. 3 shows the heat exchange system in a charging mode.

The heat exchange flow 13 of the heat transfer fluid 13 is directed in the charging mode direction (see arrow in FIG. 3). The flow adjusting element 134, 1341 is advantageous installed upstream of the charging unit 200 (FIG. 3): Relatively cold heat transfer fluid passes the flow adjusting element 134 before absorbing heat from the charging unit.

Figure 2:
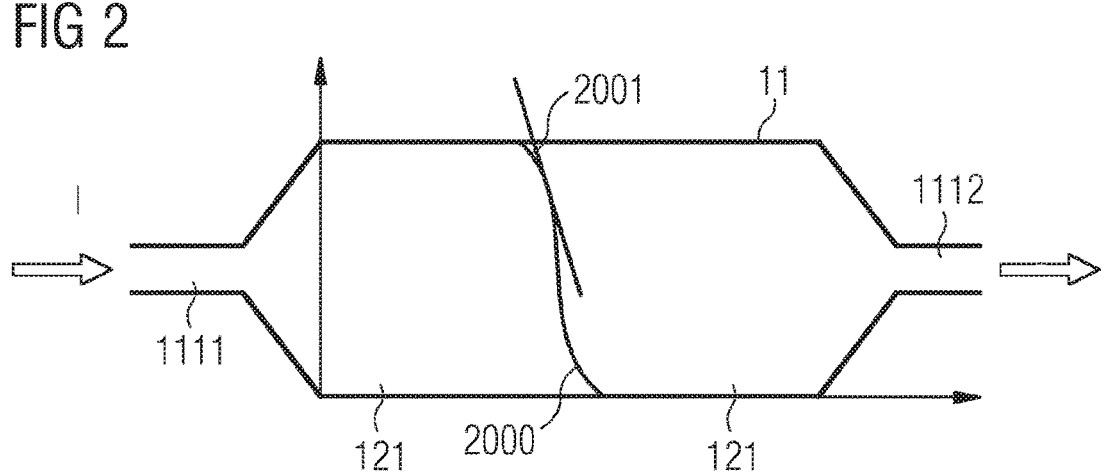
FIG. 2 shows a temperature distribution of the heat exchange chamber of FIG. 1 in a charging mode.

For the charging mode, the heat transfer fluid 13 is heated up from ambient conditions by the electrical heating device (charging unit 200). This charged (heated) heat transfer fluid is guided into the heat exchange chamber interior 112 of the heat exchange chamber 11 for charging of the heat storage material. Thereby the heat exchange between the heat transfer fluid and the heat storage material takes place. With reference 2000 the temperature front at a certain time of this charging process is shown (FIG. 2). In addition, the temperature gradient 2001 which results in the temperature front is depicted.

For the discharging mode the heat exchange system 1 comprises one or several heat exchange chambers 11 mentioned above, an active fluid motion device 1341 to circulate the heat transfer fluid 13 and a thermal machine for re-electrification, which can be a water/steam cycle 1003. The working fluid of this cycle is water and steam. The water/steam cycle 1003 has the function of a discharging unit 400. Essential components of the steam turbine cycle 1003 are a steam turbine 1006 and a generator 1004.

Figure 4:
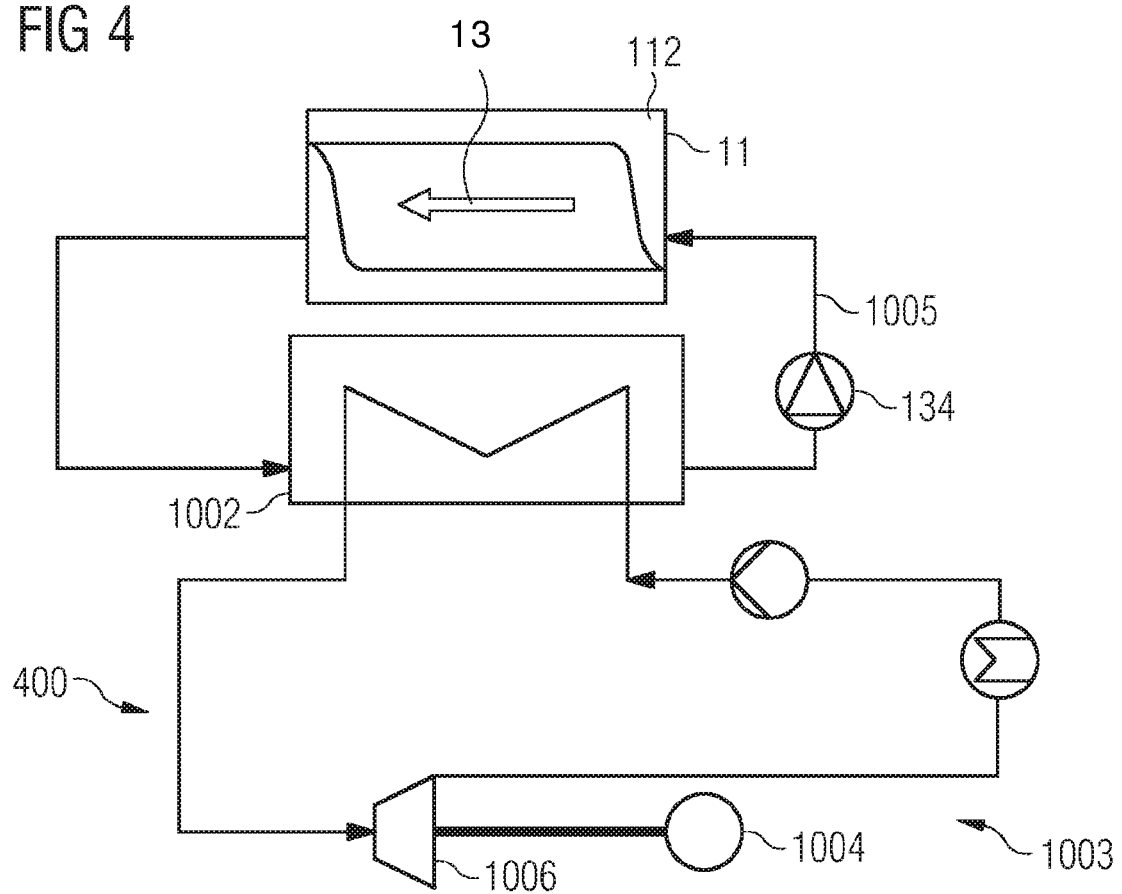
FIG. 4 shows the heat exchanges system in a discharging mode.

In the discharging mode, the heat exchange flow of the heat transfer fluid is directed into the charging mode direction 136 (see arrow FIG. 4).

With the aid of the heat exchange system (heat exchanger) 1002 heat of the heat transfer fluid is transferred to the working fluid of the steam cycle 1003.

The heat exchange system 1 comprises a closed loop 1005. Heat exchange fluid which has passed the heat exchange chamber interior 112 is guided back into the heat exchange chamber interior 112.

Figure 5:
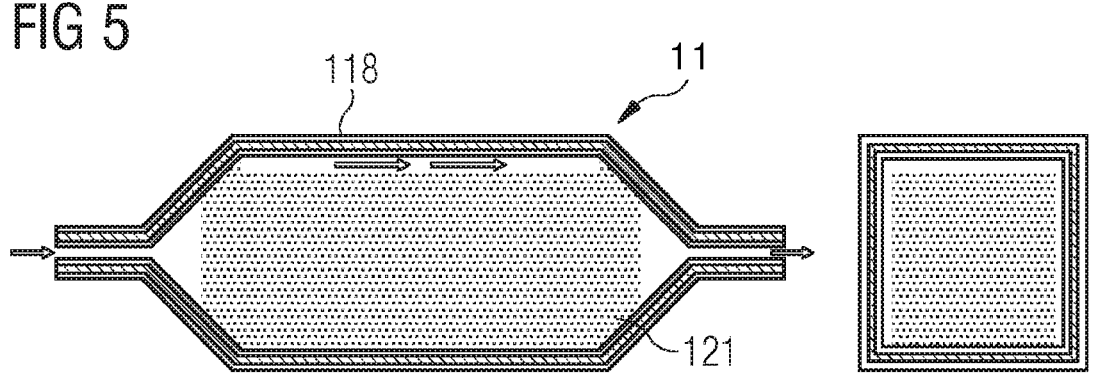
FIG. 5 shows a heat exchange chamber with an uncontrolled flow.

FIG. 5 shows the problem of packing of the heat storage material. An additional path on the ceiling of the heat exchange chamber for flow of heat transfer fluid is available. The control of heat exchange flow through the heat exchange chamber interior is crucial. Based on embodiments of the invention, the gap is reduced.

Figure 6:
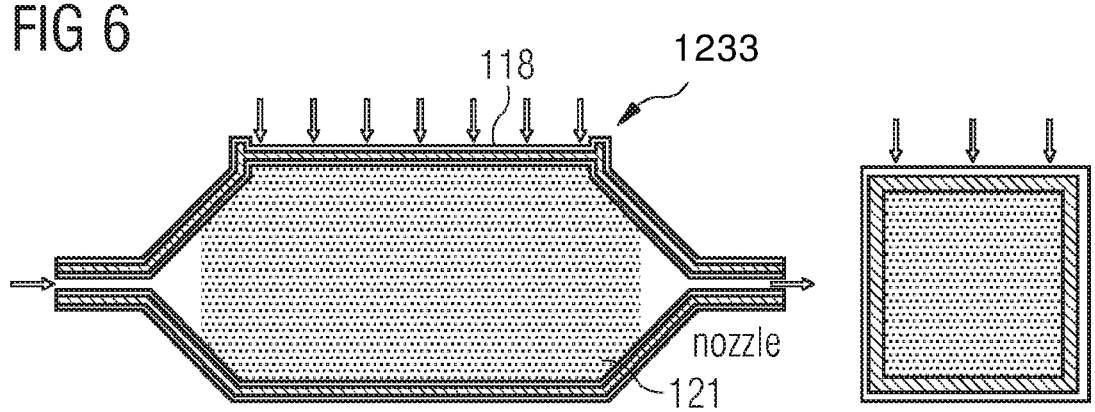
FIG. 6 shows a solution for the avoidance of the uncontrolled flow of heat transfer fluid depicted in FIG. 5.

Concerning a first embodiment, the ceiling 118 of the heat exchange chamber is just laid on the heat storage material. Due to gravity force (or vacuum in the heat exchange chamber interior by sucking of gaseous heat transfer fluid), the ceiling 118 is pressed to the heat storage material (FIG. 6). With the installation of guidance system (e.g. rail guidance) or rim structures (e.g. notches, indentations, grooves 1233) along the borders of the ceiling and supporting structure an even lowering (vertical movement in the direction of the arrows) of the ceiling is ensured. The lowering of the ceiling and the sealing of the gap occurs due to the ceilings net weight. Furthermore the guidance of the ceiling and the connections to the walls are designed such that no leakage occurs in the heat storage unit. Additionally it is possible to cover the entire storage with a foil to ensure leakage tightness. This foil is glued to the outer storage containment and can be made of EPDM foil.

Figure 7:
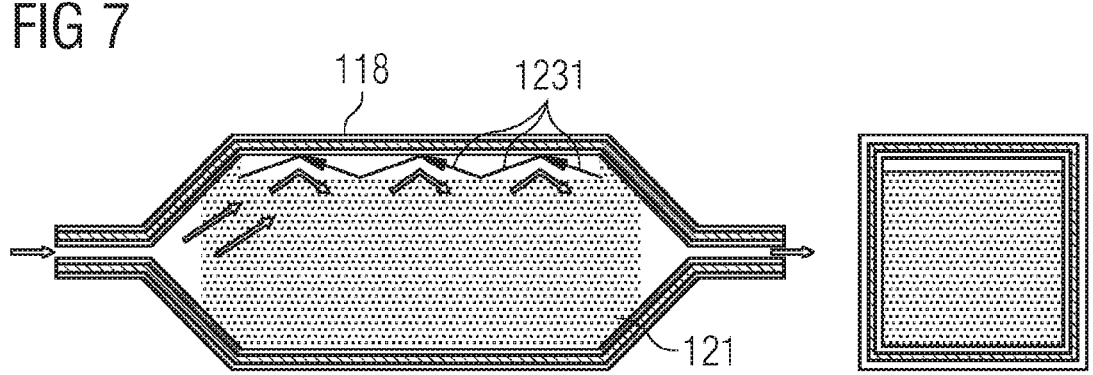
FIG. 7 shows a solution for the avoidance of the uncontrolled flow of heat transfer fluid depicted in FIG. 5.

In an alternative embodiment, flow flaps 1231 are used to compensate the packing of the heat storage material. To close the gap passive flow flaps 1231 are installed over the whole heat exchange chamber storage length. These flow flaps are mounted with a flexible bearing, as shown in FIG. 7. When the filling height of the storage decreases, because of the higher density of the storage filling material, the flow flaps close the gap between the ceiling and the actual filling height continuously due to their net weight.

It is also possible to build the ceiling, also as firmly connected support structure, to close the gap passive flow flaps are installed over the whole storage length. These flow flaps are mounted with a flexible bearing, as shown in FIG. 7. When the filling height of the heat storage material decreases, because of the higher overall density of the heat storage material, the flow flaps close the gap between the ceiling of the heat exchange chamber and the actually filling height continuously due to their net weight.

Figure 8:
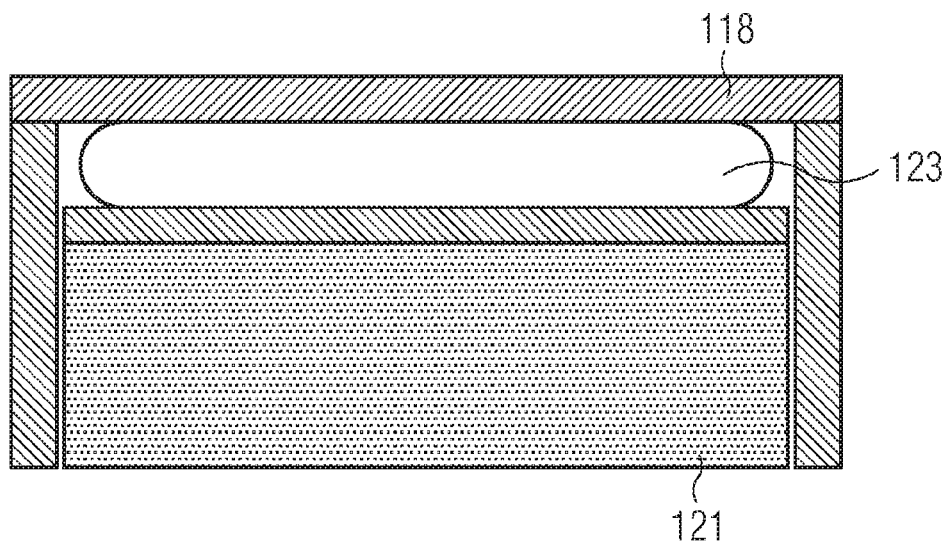
FIG. 8 shows a first alternative embodiment of the invention.

The embodiment concerning FIG. 8 the flexible flow obstacle 123 which may comprise an air bag. To prevent bypass flows and resulting heat losses, one or more air bags can be installed between the supporting structure of the heat storage and the lowering, insulated ceiling. The number and the size of installed air bags depend on the permeability of the insulation above the storage material towards the heat transfer fluid. The air bags 123 block the heat transfer fluid, so that it has to flow through the storage material to reach the second opening. The air bag 123 has to be made out of a flexible, elastic material which adapts to the form of the gap. It also needs to be temperature resistant to the temperatures occurring above the insulated ceiling. The volume of the air bag has to adapt to the volume of the gap (especially height and width if the length of the air bag is parallel to the flow direction of the heat transfer fluid) at all times during operation. This can be solved by pumping a fluid (e.g. air) into the air bag when the storage is cooled down (discharging) and by pumping a fluid out of the air bag when the storage is heated up (charging) in a way that the pressure in the air bag is kept at a constant level.

Figure 9:
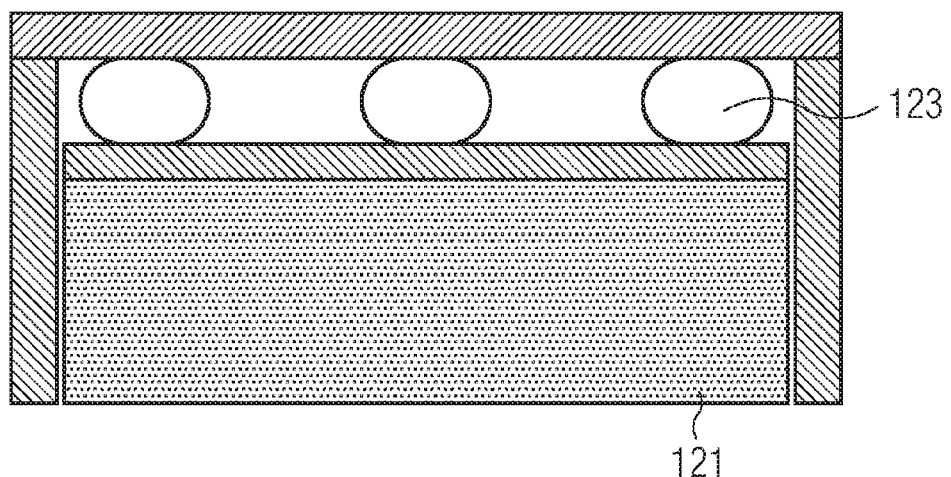
FIG. 9 shows a second alternative embodiment of the invention.

Alternatively, a number of air bags 123 is possible, too (see FIG. 9).

Figure 10:
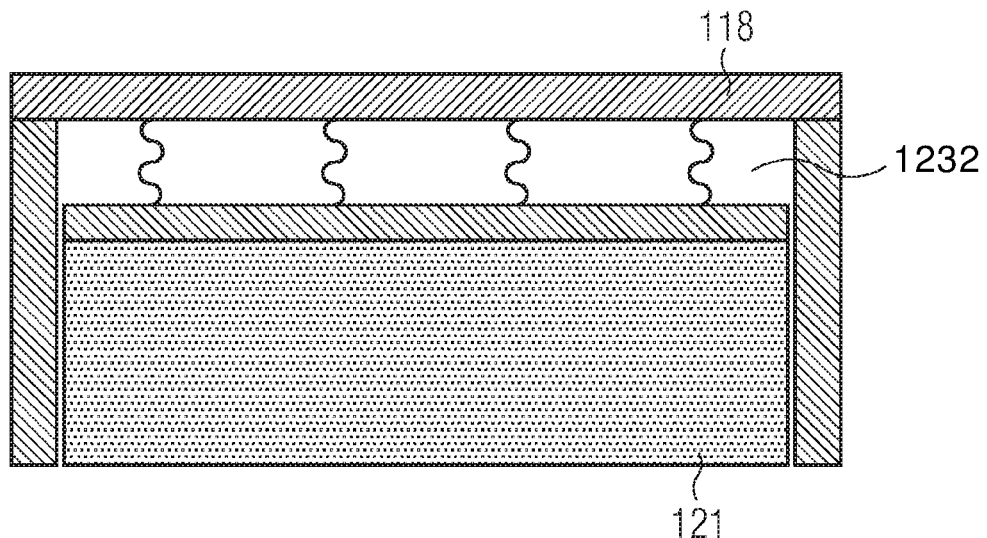
FIG. 10 shows a third alternative embodiment of the invention.
Figure 11:
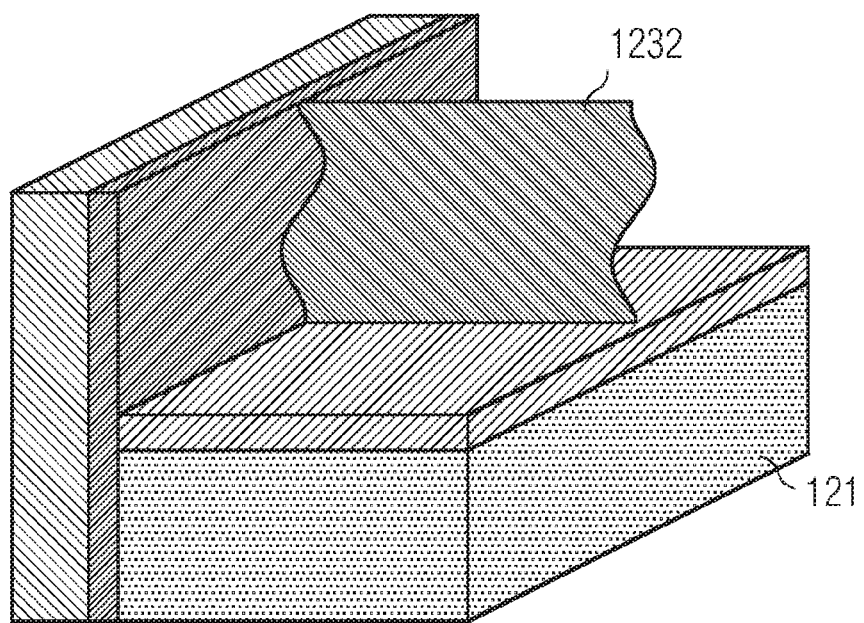
FIG. 11 shows a fourth alternative embodiment of the invention.

Another option to increase the flow resistance between the insulated ceiling (118) and the supporting structure of the heat storage material is to install flexible flow obstacles (1232) which cover the entire cross section of the growing gap (see FIG. 10). These flow obstacles are connected to both the supporting structure above and the insulated ceiling underneath which lies on top of the storage material. The flow obstacles do not absorb any forces resulting from the lowering of the insulated ceiling so that the insulated ceiling is always in direct contact with the storage material due to gravity and/or the low pressure inside the void volume of the storage material. The flow obstacles can be made out of temperature resistant fabrics with a high flow resistance and they can be folded before the first operation of the heat storage starts as indicated in FIG. 5. As the insulated ceiling lowers during operation of the heat storage, the folded fabrics will step by step unfold and therefore they will cover the cross section of the gap entirely at all times. There can be a guiding system at the side of the heat storage which connects the flow obstacles to the inner wall to reduce leakage at the sides of the flow obstacles (see FIG. 11).

A further embodiment results by at least partly digging of the heat exchange chamber: In order to reduce the installation cost of the heat exchange chamber and in order to create a volume adapting containment (heat exchange chamber with the packing device) the heat exchange chamber is at least partly located in an excavation.

The heat storage material comprises stone. Loads of the heat exchange chamber, e.g. due to thermal expansion and gravity forces, will be supported by the surrounding soil and a flexible ceiling.

The boundaries of the heat exchange chamber and the base of the heat exchange chamber can be made out of concrete, steel, porous concrete, foamed clay or any other building material which is able to separate the surrounding soil from the storage material inside. Especially for a cold end of the heat exchange chamber, sheet pile walls can be a cheap and simple way to build an airtight boundary between storage material and soil.

Locks of the sheet pile wall are be welded so that the sheet pile wall is airtight. The sheet pile wall and the base of the heat exchange chamber form a fixed and defined shape so that the heat transfer fluid can be distributed and flow optimally through the heat exchange chamber interior with the stones.

Because the heat storage material is strictly separated from the surrounding soil, the heat exchange chamber with the heat storage material is more independent from a quality of the surrounding soil. Therefore, the number of possible locations to install the heat exchange chamber of the heat exchange system increases.

A fixed shape of the heat exchange chamber prevents the excavation from flattening due to thermal expansion and shrinking which would increase heat losses due to declined insulation and increased surface.

Thermal insulation layers are attached to the heat exchange boundaries (e.g. ceiling, side walls or vase) either on the inside or on the outside to reduce heat losses and to save the surrounding soil from overheating. The insulation material is selected from the group of ceramics, sinter, bricks, foamed clay, mineral wool, mineral foam, mineral fibers, foam glass, vermiculite, perlite, chamotte, formed vacuum components, calcium silicate, and microporous insulation material.

Instead of a conventional static ceiling with thermal insulation, a flexible layer of thermal insulation covers the heat storage material. Optionally an inner layer to protect the entire thermal insulation layer from abrasion is to be installed.

In order to prevent the heat transfer fluid from exiting the heat exchange chamber to the sides, an airtight foil is installed. This foil can be installed in between the supporting structure (heat exchange chamber boundaries like heat exchange chamber wall or base of the heat exchange chamber) and the insulation layer.

Since there is no static ceiling, the airtight foil on top of the heat exchange chamber directly lies on top of the insulation layer. The foil can be tightly connected to the top of the side walls of the heat exchange chamber so that no air gaps will occur. To avoid tearing of the airtight foil, it can be installed with wrinkles so that it can unfold in the case of a thermal expansion of the heat storage material.

The thermal insulation layer (or the abrasion protection layer) directly lies on top of the heat storage material so that no further supportive structure is needed here. A soil layer is located on top of the thermal insulation layer to cover it.

The soil on top of the heat exchange chamber is preferably the soil taken from the excavation in order to avoid expensive transportation.

The thermal insulation layer which lies on top of the heat storage material can be straight or curved depending on its total expansion and/or shrinking due to the temperature changes and the load resulting from the soil on top of it to avoid a formation of air gaps The first opening (inlet opening) and the second opening (outlet opening) of the heat exchange chamber are tightly connected to the supporting structure so that no heat transfer fluid can leak. The defined shape of the heat exchange chamber boundaries of the heat exchange chamber prevent the first and the second opening from shifting. This results in an optimal position of the first and second opening throughout the entire lifecycle of the heat exchange chamber so that the heat transfer fluid is distributed ideally.

Because a part of the piping system which connects to the heat exchange chamber is installed below ground level, expensive and complex pipe support can be avoided. The weight of this part of the piping system is supported by the surrounding soil.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A heat exchange system, with
at least one horizontal heat exchange chamber with heat exchange chamber boundaries which surround at least one heat exchange chamber interior of the heat exchange chamber, wherein
the heat exchange chamber boundaries comprise at least one first opening at a first end of the horizontal heat exchange chamber for guiding in an inflow of at least one heat transfer fluid into the heat exchange chamber interior and at least one second opening at a second end of the horizontal heat exchange chamber for guiding out an outflow of the at least one heat transfer fluid out of the heat exchange chamber interior, wherein the at least one heat transfer fluid flows through the heat exchange chamber interior of the horizontal heat exchanger from the first end to the second end in a heat exchange flow;

at least one heat storage material is arranged in the heat exchange chamber interior such that the heat exchange flow of the at least one heat transfer fluid through the heat exchange chamber interior of the horizontal heat exchanger causes a heat exchange between the heat storage material and the at least one heat transfer fluid, wherein the at least one heat storage material is comprised of a plurality of stones, wherein the plurality of stones are subject to packing, wherein said packing includes at least one of breaking, compacting, and shrinking; and wherein the heat exchange chamber comprises at least one moveable passive packing device located at a ceiling portion of the heat exchange chamber, wherein the at least one moveable passive packing device is configured to compensate for a packing of the heat storage material within the heat exchange chamber interior by occupying a volume of space within the heat exchange chamber interior, the volume of space created by the packing of the heat storage material; further wherein the moveable passive packing device at least one of prevents, counteracts, and reduces an additional heat exchange flow path of the at least one heat transfer fluid.

2. The heat exchange system according to claim 1, wherein an interior portion of at least one of the heat exchange chamber boundaries comprises the moveable passive packing device.

3. The heat exchange system according to claim 2, wherein the additional heat exchange flow path is along a ceiling of the heat exchange chamber.

4. The heat exchange system according to claim 3, wherein the ceiling is a vertically sliding ceiling of the heat exchange chamber.

5. The heat exchange system according to claim 3, wherein a side wall of the chamber comprises at least one sheet pile wall.

6. The heat exchange system according to claim 3, wherein the heat exchange chamber boundary with the moveable passive packing device is a sagging ceiling of the heat exchange chamber, wherein the sagging ceiling is supported by the heat storage material.

7. The heat exchange system according to claim 3, wherein the ceiling and a side heat exchange chamber boundary are connected together and hermetically sealed.

8. The heat exchange system according to claim 1, wherein the moveable passive packing device comprises at least one flexible flow obstacle for the heat exchange flow.

9. The heat exchanges system according to claim 8, wherein the flexible flow obstacle comprises at least one bag which is filled with air.

10. The heat exchange system according to claim 1, wherein the moveable passive packing device is arranged between at least one heat exchange boundary of the heat exchange chamber and the heat storage material.

11. The heat exchange system according to claim 1, wherein the moveable passive packing device comprises flow flaps.

12. The heat exchange system according to claim 11, wherein the flow flaps are passive flow flaps which are arranged at the ceiling of the heat exchange chamber.

13. The heat exchange system according to claim 1, wherein the at least one heat transfer fluid comprises a gas at ambient gas pressure.

14. The heat exchange system according to claim 1, wherein the heat exchange chamber is at least partly arranged in at least one soil excavation of a soil.

15. The heat exchange system according to claim 14, wherein at least one the heat exchange chamber boundaries is at least partly formed by at least one soil boundary.

16. A method for exchanging heat by using the heat exchange system according to claim 1, wherein in an operating mode of the heat exchange system the heat exchange flow of the at least one heat transfer fluid is guided through the heat exchange chamber interior, wherein a heat exchange between the heat storage material and the at least one heat transfer fluid is caused.

17. The heat exchange system according to claim 1, wherein the moveable passive packing device is an air bag.

18. A heat exchange system, with
at least one horizontal heat exchange chamber with heat exchange chamber boundaries, the heat exchange chamber boundaries surrounding at least one heat exchange chamber interior of the heat exchange chamber and establishing a volume of the at least one heat exchange chamber interior, wherein the heat exchange chamber boundaries comprise at least one first opening at a first end for guiding in an inflow of at least one heat transfer fluid into the heat exchange chamber interior and at least one second opening at a second end for guiding out an outflow of the at least one heat transfer fluid out of the heat exchange chamber interior, wherein the at least one heat transfer fluid flows through the heat exchange chamber interior of the horizontal heat exchanger from the first end to the second end in a heat exchange flow;

at least one heat storage material is arranged in the heat exchange chamber interior such that the heat exchange flow of the at least one heat transfer fluid through the heat exchange chamber interior of the horizontal heat exchanger causes a heat exchange between the heat storage material and the at least one heat transfer fluid, wherein the at least one heat storage material is comprised of a plurality of stones, wherein the plurality of stones are subject to packing, wherein said packing includes at least one of breaking, compacting, and shrinking; and wherein the heat exchange chamber comprises at least one moveable passive packing device located at a ceiling portion of the heat exchange chamber for compensation of a packing of the heat storage material within the heat exchange chamber interior by at least one of: reducing the volume of the heat exchange chamber interior to account for the packing and occupying an unfilled space within the volume of the heat exchange chamber interior, the unfilled space created by the packing; further wherein the moveable passive packing device at least one of prevents, counteracts, and reduces a secondary heat exchange flow path of the at least one heat transfer fluid through the heat exchange chamber interior.

19. The heat exchange system according to claim 18, wherein the at least one moveable passive packing device is an air bag.

* * * * *